(12) United States Patent
Guha et al.

(10) Patent No.: US 9,944,788 B2
(45) Date of Patent: Apr. 17, 2018

(54) SHEET MOLDING COMPOSITION CONTAINING SURFACE MODIFIED GLASS FILLER

(71) Applicant: CONTINENTAL STRUCTURAL PLASTICS, INC., Auburn Hills, MI (US)

(72) Inventors: Probir Kumar Guha, Troy, MI (US); Michael J. Siwajek, Rochester Hills, MI (US); Michael J. Hiltunen, Rochester, MI (US); Michael Z. Asuncion, Ann Arbor, MI (US)

(73) Assignee: CONTINENTAL STRUCTURAL PLASTICS, INC., Auburn Hills, MI (US)

(*) Notice: Subject to any disclaimer, the term of this patent is extended or adjusted under 35 U.S.C. 154(b) by 113 days.

(21) Appl. No.: 14/755,664

(22) Filed: Jun. 30, 2015

(65) Prior Publication Data

US 2015/0376398 A1    Dec. 31, 2015

Related U.S. Application Data

(60) Provisional application No. 62/018,747, filed on Jun. 30, 2014.

(51) Int. Cl.
*C08K 7/14*    (2006.01)
*C08K 9/06*    (2006.01)
(Continued)

(52) U.S. Cl.
CPC .......... *C08L 63/00* (2013.01); *C03C 25/1095* (2013.01); *C03C 25/26* (2013.01);
(Continued)

(58) Field of Classification Search
CPC .... C08J 2363/10; C08J 2367/06; C08J 5/043; C08J 5/08; C08J 2335/02; C08L 63/10;
(Continued)

(56) References Cited

U.S. PATENT DOCUMENTS

| | | |
|---|---|---|
| 3,936,285 A | 2/1976 | Maaghul |
| 3,963,669 A | 6/1976 | Wurmb et al. |

(Continued)

FOREIGN PATENT DOCUMENTS

| | | |
|---|---|---|
| CN | 105295325 A | 2/2016 |
| EP | 2583953 A1 | 4/2013 |

(Continued)

OTHER PUBLICATIONS

Luo, Weicai et al. "Interface enhancement of glass fiber/unsaturated polyester resin composites with nano-silica treated using silane coupling agent", Wuhan University Journal of Natural Sciences, 2014, vol. 19, No. 1, pp. 34-40. (published: Feb. 2014). See abstract: Experimental; Morpholygy of Glass Fiber before and after Modification; eight paragraph in Effect of the Nano-Silica and Coupling Agent on the Composites Properties; Conclusions; and Figure 7.

(Continued)

*Primary Examiner* — Kregg T Brooks
(74) *Attorney, Agent, or Firm* — Avery N. Goldstein; Blue Filament Law, PLLC

(57) ABSTRACT

A molded article is provided that has a resin matrix having a surface, the resin matrix formed from cross-linked polyester resin or vinyl-ester resin. Glass fibers are crossed linked to the resin matrix via a silane coupling agent reactive with the matrix. A molded article is provided that has a resin matrix having a surface, the resin matrix formed from cross-linked polyester resin or vinyl-ester resin. Glass fibers each covalently bonded to at least one microspheroid matrix via a silane coupling agent reactive with a surface of the at (Continued)

least one microspheroids are present in increase the fiber pull strength. A sizing composition for treating glass fibers is also provided for use in such articles.

3 Claims, 1 Drawing Sheet

(51) Int. Cl.
| | |
|---|---|
| C08K 3/40 | (2006.01) |
| C08J 5/04 | (2006.01) |
| C08J 5/18 | (2006.01) |
| C08L 63/10 | (2006.01) |
| C08L 63/00 | (2006.01) |
| C08L 67/06 | (2006.01) |
| C08L 67/00 | (2006.01) |
| C08K 13/06 | (2006.01) |
| C03C 25/40 | (2006.01) |
| C08K 7/28 | (2006.01) |
| C08J 5/08 | (2006.01) |
| C03C 25/10 | (2018.01) |
| C03C 25/26 | (2018.01) |

(52) U.S. Cl.
CPC ............... *C03C 25/40* (2013.01); *C08J 5/043* (2013.01); *C08J 5/045* (2013.01); *C08J 5/08* (2013.01); *C08K 3/40* (2013.01); *C08K 7/14* (2013.01); *C08K 7/28* (2013.01); *C08K 9/06* (2013.01); *C08K 13/06* (2013.01); *C08J 2335/02* (2013.01); *C08J 2363/10* (2013.01); *C08J 2367/00* (2013.01); *C08J 2367/02* (2013.01); *C08J 2367/06* (2013.01); *C08L 2203/16* (2013.01)

(58) Field of Classification Search
CPC ..... C08L 67/06; C09D 163/10; C09D 167/06; C09J 163/10; C09J 167/06; C08K 7/14; C08K 9/06; C08K 13/06; C08K 7/28; C03C 25/40

See application file for complete search history.

(56) References Cited

U.S. PATENT DOCUMENTS

| | | | |
|---|---|---|---|
| 4,049,865 A | | 9/1977 | Maaghul |
| 4,179,537 A | * | 12/1979 | Rykowski ......... B32B 17/10688 |
| | | | 106/287.16 |
| 4,260,358 A | | 4/1981 | Mehnert |
| 4,643,126 A | | 2/1987 | Wilkinson et al. |
| 4,885,348 A | * | 12/1989 | Brown ................. C08G 18/808 |
| | | | 252/182.2 |
| 5,100,935 A | | 3/1992 | Iseler et al. |
| 5,221,431 A | * | 6/1993 | Choe .......................... C08J 5/06 |
| | | | 216/34 |
| 5,268,400 A | | 12/1993 | Iseler et al. |
| 5,854,317 A | | 12/1998 | Rinz |
| 5,972,503 A | | 10/1999 | Woodside |
| 6,270,897 B1 | | 8/2001 | Flautt et al. |
| 6,413,646 B1 | | 7/2002 | Pohl et al. |
| 6,780,923 B2 | | 8/2004 | Guha et al. |
| 6,810,693 B1 | | 11/2004 | Hartman et al. |
| 7,829,637 B2 | | 11/2010 | Guha et al. |
| 8,129,018 B2 | | 3/2012 | Hartman et al. |
| 2005/0238864 A1 | | 10/2005 | D'Souza et al. |
| 2005/0279140 A1 | | 12/2005 | Adzima et al. |
| 2006/0036003 A1 | | 2/2006 | Adzima et al. |
| 2006/0258781 A1 | * | 11/2006 | Beach ...................... C08K 7/20 |
| | | | 523/223 |
| 2007/0286999 A1 | * | 12/2007 | Dijt .......................... C03C 25/26 |
| | | | 428/292.1 |
| 2008/0160281 A1 | * | 7/2008 | Vickery .................. C03C 25/26 |
| | | | 428/295.1 |
| 2012/0183687 A1 | | 7/2012 | Nguyen et al. |

FOREIGN PATENT DOCUMENTS

| | | |
|---|---|---|
| WO | 9915331 A1 | 4/1999 |
| WO | 20130017471 A2 | 2/2013 |
| WO | 2015200811 A1 | 12/2015 |

OTHER PUBLICATIONS

International Search Report for PCT/US2015/038586, filed Jun. 30, 2015, Applicant Continental Structural Plastics, Inc., dated Sep. 10, 2015.
Arkles, Barry "Silane Coupling Agents: Connecting Across Boundaries", Gelest, Inc., www.gelest.com, © 2006, pp. 1-60.
Thomason, J.L. et al. "Sizing Up the Interphase: an insider's guide to the science of sizing"; Composites: Part A 32 (2001), pp. 313-321; Owens Corning Science and Technology Center, 2790 Columbus Road, Route 16, Granville, OH 43023 1200, USA.
Extended European Search Report dated Jun. 19, 2017 for European Application No. 15815177.9 filed Jun. 30, 2015.
Luo, Weicai et al., "Interface Enhancement of Glass Fiber/Unsaturated Polyester Resin Composites with Nano-Silica Treated Using Silane Coupling Agent", Wuhan University Journal of Natural Sciences (2014), pp. 34-40, vol. 19, Issue 1, Copyright Wuhan University and Springer-Verlag Berlin Heidelberg (2014); DOI: 10.1007/s11859-014-0975-7.

* cited by examiner

SHEET MOLDING COMPOSITION CONTAINING SURFACE MODIFIED GLASS FILLER

RELATED APPLICATIONS

This application claims priority benefit of U.S. Provisional Application Ser. No. 62/018,747 filed Jun. 30, 2014; the contents of which are hereby incorporated by reference.

FIELD OF THE INVENTION

The present disclosure generally relates to sheet molding compositions (SMC), and in particular, to glass fiber-matrix technologies and fiber sizings.

BACKGROUND OF THE INVENTION

The surface properties of objects greatly influence their interaction with surrounding materials. Glass fiber reinforcement is common to articles formed from SMC in order add strength to the article. Glass fibers are routinely used that have siloxyl group rich surfaces as well as having a sizing composition imparted to the fiber strand.

Typically, an aqueous sizing composition is coated onto the fibers during fiber formation. The fibers are oven dried. During this drying process, the solids of the sizing composition have a tendency to migrate as a function of the temperatures experienced by the fibers in a spool or other large assembly. Owing to the limited nature of interaction between conventional sizing materials and a hydrophobic matrix, it is common in article failure that fibers are observed to have slide free of the matrix, with the glass fibers being generally clean of matrix material. This failure mode suggests a weak interaction between glass fibers and the matrix. This problem is complicated by non-uniform and "insufficient" sizing on the surface of the fiber that can water absorption at the non-coated fiber-resin interface leading to property degradation associated with water absorption in composites.

In the context of glass fiber reinforced matrices, the relative free energy, morphology, and chemical reactivity of a glass surface significantly affect physical and chemical properties including, but not limited to, friction, wettability, oxidation, interaction with other molecules, and so forth. SMC articles, which contain a polymeric matrix reinforced with glass fibers are used to form a variety of vehicle panels and components. For SMC materials to displace steel and aluminum in vehicle construction, it is important to provide weight savings, resistance of corrosion, and comparable strength. Water absorbed at the matrix-fiber interface can cause delamination of the substrate as the molded part goes through ovens as is required for painting and surface treatments for automotive parts.

While the prior art recognizes this problem, the solutions of re-engineering the manufacture of glass fiber has proven to be both costly and achieve performance improvements that are tied to specific types of polymer matrices.

Thus, there is a need for a surface treatment subsequent to addition of the size composition that provides load-bearing properties to a resultant article. There also exists a need to couple particle fillers to the fiber fillers to create an overall strong SMC article improve the parts performance thru paint and other treatments that require the parts to be baked at various oven temperatures.

SUMMARY OF THE INVENTION

A molded article is provided that has a resin matrix having a surface, the resin matrix formed from cross-linked polyester resin or vinyl-ester resin. Glass fibers are crossed linked to the resin matrix via a silane coupling agent reactive with the matrix.

A molded article is provided that has a resin matrix having a surface, the resin matrix formed from cross-linked polyester resin or vinyl-ester resin. Glass fibers each covalently bonded to at least one microspheroid matrix via a silane coupling agent reactive with a surface of the at least one microspheroids are present in increase the fiber pull strength. A sizing composition for treating glass fibers is also provided for use in such articles.

BRIEF DESCRIPTION OF THE DRAWINGS

The accompanying figures, in which like reference numerals refer to identical or functionally similar elements throughout the separate views and which are incorporated in and form part of the specification, further illustrate the disclosed methods and, together with the detailed description, serve to explain the principles of the present disclosure.

DETAILED DESCRIPTION OF THE INVENTION

Figure 1:
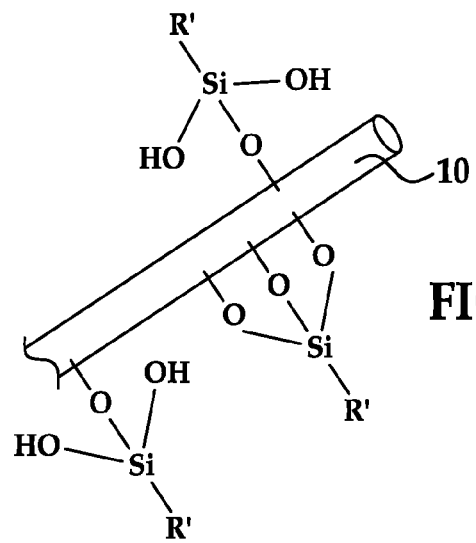
FIG. 1 is a schematic of a glass fiber treated with a silane coupling agent terminating in a reactive moiety $R^1$ that is reactive with a resin curable to form an SMC matrix.

The present invention has utility as a fiber sizing composition and a method of forming a glass fiber reinforced matrix article with improved fiber adhesion to a surrounding sheet molding composition (SMC) matrix. Through fiber surface treatment with a silane coupling reagent reactive towards both glass fiber and a surrounding SMC matrix, a relative amount of fiber adhesion within cured polymeric SMC matrix the load bearing properties of the resultant article are enhanced compared to conventional SMC articles. In some inventive embodiments, the surface of the glass fiber is covalently bonded to the surface of glass microspheroids, other glass fibers, or a combination thereof via silane coupling agents. In some inventive embodiments, the microspheroids, and the silane coupling agent reactive towards both the glass fiber surface and the surrounding matrix are combined with the components of an otherwise conventional fiber sizing composition in order to rapidly and efficiently treat glass fibers in proximity to a sizing applicator during the fiber production process. The production and application of a sizing composition to glass fibers is well known to the art. J. L. Thomason et al., Composites: Part A 32 (2001), pages 313-321. The amount of bonding between a glass fiber and a matrix is controlled by adding a silane coupling agent that is chemically unreactive towards a surrounding matrix. The silane coupling agent reactive towards the SMC matrix is also readily added to an untreated glass fiber r after the sizing has been applied with the recognition that the density of bonding sites for the silane coupling agent are greatly reduced absent removal of all or part of the sizing.

Glass fibers operative in an inventive SMC include A-type glass, C-type glass, E-type glass, S-type glass, ECR-type glass fibers, boron-free fibers wool glass fibers, chopped fragments thereof or combinations thereof.

The present invention has utility for the molding of thermoset articles with that are able to pass rigorous overcoating adhesion tests and have improved mechanical properties to conventional articles. The present invention is well suited to form vehicles components in general, and in particular those vehicle components that benefit from the additional strength associated with glass fiber adhesion to the surround SMC matrix. Exemplary vehicle components produced by the present invention include hoods, deck lids, fenders, doors, quarter panels, and roof panels, under body shields, and under body structural panels.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

The particular values and configurations discussed in these non-limiting examples can be varied and are cited merely to illustrate embodiments of the disclosed compositions and methods and are not intended to limit the scope of the appended claims.

Micromechanical mechanisms, including fiber-matrix debonding and frictional sliding, during fiber pull-out can be the source of substantial energy absorption. In addition, the fiber-matrix interphase plays a role with respect to the overall durability of glass fiber reinforced SMC. Achieving optimal balance between the structural and ballistic performance of glass fiber reinforced polymeric composite armor includes controlling the interphase response, specifically through the use of silane coupling agent based aqueous fiber-sizing packages.

While the silane coupling agent is used to maintain the durability of the fiber-reinforced polymeric composites, the silane coupling agent also has the effect of smoothing, or filing, the natural micro-roughness of unsized glass fiber. The decreased roughness of the sized fibers decreases the amount of energy that pulls the fiber through the polymeric matrix after fiber-matrix debonding has occurred.

Associating glass microspheroids with the fiber surface counteracts the post-debonding fiber pull energy decrease observed with only treating a glass fiber surface with a conventional silane coupling. The slide of a roughened glass fiber through a matrix requires additional energy relative to a smooth fiber of the same dimensions in a like matrix. Factors related to the amount of energy needed to draw a debonded fiber through a surrounding matrix include in part: mean fiber surface roughening particle size, percentage of fiber surface area coverage by particles, the covalency of the bond between glass fiber surface and a particle, the average number of bonds between the fiber surface and a particle, the fiber cross-sectional diameter, and the deformability of the matrix under a given set of temperature and fiber draw speed conditions. Without intending to be bound to a specific theory and ignoring competing effects that cause trends to break down beyond a certain value, the amount of energy needed to draw a debonded fiber from a matrix tends to increase as each factor increases with the exception of fiber cross-sectional diameter.

As shown in FIG. 1 the hydroxyl groups extending from a glass fiber 10 are bonded to a silyl moiety, with a moiety $R^1$ extending therefrom. $R^1$ is capable of reacting with an ethylenic unsaturation in an SMC thermoset resin to bond the glass fiber to the matrix (not shown). An optional linker between the silyl group and the reactive moiety $R^1$ is not shown in FIG. 1.

Examples of second type silane coupling agents that are chemically reactive with both glass fiber and the ethylenically unsaturated resins (having $R^1$) that upon cure from a polymeric SMC matrix and used in the disclosed fiber-sizing packages and sizing compositions include, but are not limited to: 3-aminopropyltrimethoxysilane, 3-aminopropyltriethoxysilane, 3-gylcidoxypropyltrimethoxysilane, 3-glycidoxypropyltriethoxysilane, (3-glycidoxypropyl)bis(trimethylsiloxy)methylsilane, (3-glycidoxypropyl)dimethylethoxysilane, (3-glycidoxypropyl)methyldiethoxysilane, (3-glycidoxypropyl)methyldimethoxysilane, methacryloxymethyltriethoxysilane, methacryloxymethyltrimethoxysilane, methacryloxypropyldimethylethoxysilane, methacryloxypropyldimethylmethoxysilane, methacryloxypropylmethyldimethoxysilane, methacryloxypropyltrimethoxysilane; methacryloxypropyltriethoxysilane, 3-methacryloxypropyldimethylchlorosilane, methacryloxypropylmethyldichlorosilane, methacryloxypropyltrichlorosilane, 3-isocyanotopropyldimethylchlorosilane, 3-isocyanatopropyltriethoxysilane, 3-isocyanatopropyltriethoxysilane, and methacryloxypropyltriethoxysilane, cyclic azasilanes, and combinations thereof.

Generally, silane coupling agents having acryl, amino or glycidyl groups are reactive with a matrix under matrix cure conditions. Silane coupling agents containing a silane group are reactive towards glass fiber hydroxyl groups. As such, a silane coupling agent extending an alkyl group upon reaction with a glass fiber creates a lipophilic surface that is wet by matrix materials but not covalently bonded thereto. Examples of silane coupling agents reactive towards a glass fiber while unreactive towards a matrix include, but are not limited to, propyltrimethoxysilane, propyltriethoxysilane, octyltriethoxysilane, methoxymethyltrimethylsilane, and 3-methoxypropyltrimethoxysilane. These unreactive silanes are conventionally used in SMC glass fiber sizings.

It is appreciated that blocking of a reactive moiety serves to limit reaction of the matrix reactive moiety until during matrix cure. De-blocking of reactive moieties typically is elected to occur at temperature between 200° F. and 400° F. Groups suitable for use as a blocker are well-known in the art and include groups such as alcohols, lactams, oximes, malonic esters, alkyl acetoacetates, triazoles, phenols, amines, and benzyl t-butylamine. These groups are particularly well known for blocking isocyanate matrix reactive moieties. Phenolic blocked silanes also operative herein are detailed in U.S. Pat. No. 6,413,646.

FIG. 1 depicts a glass fiber 10 having silane coupling agent 12 extending from the surface and terminating in a reactive moiety $R^1$ that reacts during resin cure to form an SMC matrix. The reactive moiety $R^1$ is typically a terminal group in the aforementioned list of matrix reactive silane coupling agents.

Disclosed is a process for improving the durability of fiber-reinforced composites by bonding the fibers tot the surrounding SMC matrix, while in other embodiments increasing the surface roughness of the fibers. To increase frictional sliding energy during fiber pullout, the inventive fiber sizing composition includes glass microspheroids bonded to the fiber surface or other glass fibers.

Figure 2:
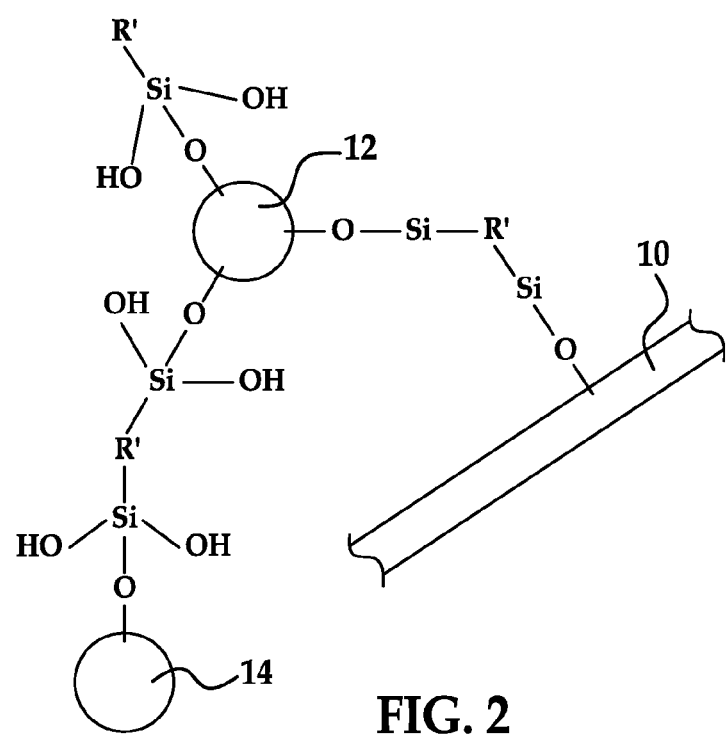
FIG. 2 is a schematic of a glass fiber treated with a dipodal silane coupling agent reactive with a low density glass microsphere to increase the pull strength needed to remove such a fiber from a cured SMC matrix.

A microspheroid particle can be bonded to the fiber surface by resort to a silane coupling agent having two moieties that are reactive with glass surface hydroxyl groups to covalently bond the fiber to the microspheroids. FIG. 2 depicts a microspheroid 12 coupled to a glass fiber 10 with dipodal silane coupling agent having a matrix reactive moiety $R^1$. A second microspheroid 14 is coupled to microspheroid 12 with second dipodal silane coupling agent having a matrix reactive moiety $R^1$. Coupling agents for binding a glass fiber to another such fiber or a glass microspheroid an unsaturated polyurethane during resin cure to form a matrix illustratively include 1,1-Bis(trimethoxysilylmethyl)ethylene; 1,1-Bis(trichloromethyl)ethylene; 1,3-[Bis(3-triethoxysilylpropoxy)polyethylenoxy]-2-methylenepropane; 1,6-Bis(tricholorosilyl)hexane; 1,6-Bis(tricholorosilyl)methane; 1,8-Bis(trichlorosilyl)octane; 1,3-Bis(tricholorosilyl)propane; Bis(triethoxysilyl)ethane; Bis(triethoxysilyl)methane; 1,8-Bis(triethoxysilyl)octane; 1,2-Bis(trimethoxysilyl)ethane; Bis(trimethoxysilylethyl)benzene; 1,6-Bis(trimethoxysilyl)hexane; 1,4-Bis(trimethoxysilylmethyl)benzene; 1,8-Bis(trimethoxysilyl)octane; each alone, in combination with other dipodal coupling agents, or in combination with unipodal silane coupling agents. It is appreciated that an optional liker between the silane groups of a dipodal coupling agent separates the silyl groups by a length corresponding to from 1 to 30 linear aliphatic carbon atoms. Without intending to be bound to a particular theory, it is believed that individual silane groups of a dipodal coupling agent bond across: two glass fibers, (a glass fiber)-(a glass microspheroid), or two microspheroids. A reactive moiety containing silane coupling agent that is dipodal or unipodal that is also bound to a glass fiber or glass microspheroid then reacts with the thermoset resin during cure to bond the fiber or microspheroid to the matrix.

In addition to using a silane coupling agent that is reactive with an unsaturated resin that cures to form a matrix, a silane coupling agent having an amine reactive group is readily bonded to a glass fiber or glass microspheroid via the silane moiety and then the amino moiety is reacted with a diisocyanate to create a cyano moiety available to react with the unsaturated resin during matrix cure. Similarly, a reactive moiety of a silane coupling agent is readily reacted by conventional techniques to form reactive urethane or urea moieties extending from a silane coupling agent bound to a glass fiber or glass microspheroid via a silyl moiety. The urethane or urea moiety is reactive with the unsaturated resin during matrix cure through a nitrogen containing curing agent or even autocatalytic activity. It is appreciated that isocyanate functional silanes, are readily reacted directly with glass fibers or microspheroids, or sequentially with the diisocyanate (TDI, MDI) prior to cure. Amino-silane coupling agents and alkanolamine functional silane coupling agents are well-suited to be blended with polyols present in the formulation prior to cure as isocyanate functional silane coupling agents couple with the polyol; and alkanolamine functional silanes react with the isocyanate to form urethane linkages, while amino-silane coupling agents react with the isocyanates to yield urea linkages.

Figure 3:
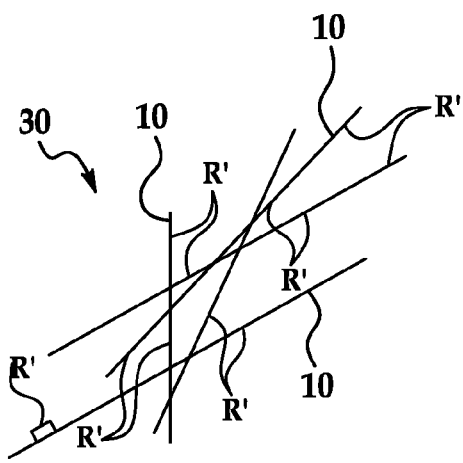
FIG. 3 a schematic of a glass fiber mass formed with silane coupling agent molecules forming bonds between the individual fibers.

In an alternative embodiment, in lieu of, or in combination with silane coupling agents, diisocyanates or polyisocyanates are used as coupling agents to create urethane linkages that covalently bond the thermoset matrix to a surface of a glass fiber or glass microspheroid, or in the case of a polyisocyanate forming a three dimensional plurality of linkages between fibers, microspheroids, or both. A three dimensional matrix is shown in FIG. 3 generally at 30 where the glass fibers 10 have the same properties as those detailed in the aforementioned figures with dipodal silane coupling agents. It is appreciated that organometallic catalysts such as organotin compounds like dibutyltindilaurate promote urethane linkage formation from diisocyanates.

It is appreciated that such a microspheroid also includes in certain embodiments, matrix reactive silane coupling agent extending from the microspheroid surface. Hydrolyzable surface groups on a microspheroid reactive towards a fiber surface hydroxyl group are particular well-suited for bonding and illustratively include inorganic oxygen atoms. Other moieties that can be added to a microspheroid surface that are reactive toward the fiber surface illustratively include oxygen atoms, trioctylphosphine oxide (TOPO), thiol, amine, carboxyl, or silane. It is appreciated that matrix coupling silanes are ready added to a microspheroid, thereby allowing a glass fiber to be indirectly coupled to an SMC matrix by way of a covalently bonded microspheroid.

According to the present invention, a microspheroid has a mean diameter of between 10 and 120 microns. In certain embodiments, the microspheroids are monodisperse, while in other embodiments; the range of sizes is between 5 and 200 microns. It is appreciated that microspheroids with higher crush strength are less likely to be damaged by sheer mixing associated with SMC formulation and flow pressures.

As used herein a microspheroid is defined to include a hollow microsphere or a solid bead having an aspect ratio of between two normal maximal linear dimensions of between 1 and 1.6. Typically, a microspheroid particle is formed of glass or a thermoplastic material. In some inventive embodiments, the microspheroid is within 10 linear dimension percent of spherical and formed of glass.

In one embodiment, the microspheroids are added to existing complete fiber-sizing packages along with a silane coupling agent inducing bonding between the microspheroid and the fiber to facilitate ease in manufacturing. In other embodiments, an SMC matrix reactive coupling agent is added to the otherwise conventional sizing package. In still other embodiments, the microspheroids having matrix reactive coupling agent on the microspheroid surface are added to existing complete fiber-sizing packages along with a silane coupling agent inducing bonding between the microspheroid and the fiber is added to the otherwise conventional sizing package.

Conventional fiber-sizing package composition components include aqueous dispersions of film former, surfactants, lubricants, anti-static agents, and a single type of silane coupling agent. Generally, the film former is any composition that protects the fibers from damage during processing and handling. Types of film formers that may be used in the disclosed fiber-sizing packages and sizing compositions include, but are not limited to, epoxy, polyvinyl acetate, polyurethane, polyolefins, and unsaturated polyester resins. Generally, the surfactant is any composition that aids in the dispersion of the film former. Types of surfactants that may be used in the disclosed fiber-sizing packages and sizing compositions include, but are not limited to, polyvinylpyrolidone, polyethylene oxides, or polyethylene oxide-polypropylene oxide-polyethylene oxide block copolymer surfactants. Generally, the lubricant is any composition that aids in the processing of the fibers. Types of lubricants that may be used in the disclosed fiber-sizing packages and sizing compositions include, but are not limited to, polyethylene imine alkylamides, cationic fatty acid amides, tetraethylene pentamine, and polyethylene glycol esters. Generally, the anti-static agent is any composition that reduces static electricity build-up and charging during fiber processing. Types of antistatic agents that may be used in the disclosed fiber-sizing packages and sizing compositions include, but are not limited to, cationic organic quaternary ammonium salts.

An inventive sizing composition includes a film former, a surfactant, a silane coupling agent non-reactive towards the matrix, a matrix reactive coupling agent, and in some embodiments, microspheroids. The inventive sizing composition may include, but not limited to these composition ranges, the following exemplary components by % weight composition (based on solids mass, excluding the aqueous portion): 50-90 wt % film former(s); 0-10 wt % surfactant(s); 0.1-15 wt % of matrix non-reactive silane coupling agent; 0.1-15 wt % of matrix reactive silane coupling agent; and 0-50 wt % microspheroids. The matrix nonreactive/reactive silane coupling agents are present in a molar ratio of 1:02-0.7. Alternatively, only reactive silane coupling agent is present.

An exemplary hybrid sizing package according to the present invention for covalently bonding a glass fiber to an SMC matrix includes the following components, by approximate % composition (based on solids mass, excluding the aqueous portion): 55% epoxy resin film former; 5% polyethylene oxide-polypropylene oxide-polyethylene oxide block copolymer surfactant; 15% methacryloxypropyltrimethoxysilane; 15% propyltrimethoxysilane; 10% polyethylene glycol ester lubricant.

An exemplary hybrid sizing package according to the present invention for covalently bonding a glass fiber to an microspheroids includes the following components, by approximate % composition (based on solids mass, excluding the aqueous portion): 52% epoxy resin film former; 5% polyethylene oxide-polypropylene oxide-polyethylene oxide block copolymer surfactant; 4% 1,4-Bis(trimethoxysilylmethyl)benzene, 6% propyltrimethoxysilane; 10% polyethylene glycol ester lubricant; and 23% 18 micron diameter glass microspheroids having a specific gravity of 0.60 and an isotactic crush strength of 28,000 psi.

The aqueous-based fiber sizing packages were formulated within concentration ranges conducive for industrial production, generally 5-10% solids in water, including film formers and surfactants. Acetic acid was used to adjust the pH of the solution to approximately 4.5 for hydrolysis of the silane coupling agents. The resulting sizing is well-suited for application of E-glass, S-glass; H-glass; A-glass and basalt fiber.

In order to strengthen interactions between a microspheroid and a surrounding cured matrix, the microspheroid is covalently bonded to microspheroid surface coupling agent. This is referred to herein as treated or pre-treated. In certain inventive embodiments, the microspheroids are pre-treated with a surface coating adherent to the microspheroid surface. Without intending to be bound to a particular theory, the microspheroid surface is modified through covalently coupling to react hydrophilic group, such as hydroxyl groups, on the microspheroid surface to create hydrophobic surface functionality on the microspheroid surface that creates a stronger interaction with the surrounding matrix.

In some inventive embodiments, the surface activating agent molecules covalently bonded to the microspheroid surface have a terminal reactive moiety adapted to bond to a surrounding resin matrix during cure. Without intending to be bound to a particular theory, covalent bonding between a cured resin matrix and the microspheroid increases the delamination strength of the resulting SMC or BMC in tests such as ASTM D3359. Alternatively, efficacy of the present invention is measured by a decrease in measured water absorption, compared to conventional materials.

A terminal reactive moiety that is reactive with an SMC resin during cure illustratively includes a tertiary amine-; hydroxyl-; imine-; an ethylenic unsaturation, such as an allyl- or acryl-; or cyano-moiety. It is appreciated that matrix cure can occur through mechanisms such as free radical cure, moisture cure, and combinations thereof.

Alternatively, it is appreciated that a glass fiber surface silane coupling agent is readily mixed into the pre-cured SMC formulation and glass fibers added thereto to induce glass fiber surface activation prior to initiation of matrix cure. Typically, the silane coupling agent is present in concentrations of about 0.005 to 0.1 grams of silane coupling agent per gram of glass fiber.

To achieve a desired degree of matrix adhesion, the silane coupling agent is present on the glass fiber surface in an amount to form between 0.1 to 1 monolayer on the surface of the fiber. Surface coverage is readily determined based on DSC/TGA to determine the mass of the silane on the surface of the fibers. It is appreciated that the improvements in adhesion between a fiber and the cured SMC matrix are approximately proportional to the number of the silane coupling agent molecules per unit of glass fiber surface area between 0.1 and 1 monolayers.

A principal component of an SMC formulation is a cross-linkable polymer resin such as an unsaturated polyester resin or vinyl ester resin. The prepolymer polymeric resin has a molecular weight on average of typically between 400 and 100,000 Daltons. The polyester prepolymer resins typically represent condensation products derived from the condensation of unsaturated dibasic acids and/or anhydrides with polyols. It is appreciated that the saturated di- or poly-acids are also part of the condensation process to form polyester prepolymers with a lesser equivalency of reactive ethylenic unsaturation sites. Typical SMC and BMC formulations are described in U.S. Pat. Nos. 4,260,358; 4,643,126; 5,100,935; 5,268,400; 5,854,317; 6,780,923; or 7,829,637.

Vinyl ester resins are also typically employed in SMC or BMC formulations as a polymeric resin. Vinyl ester prepolymer resins are typically the reaction product of an epoxy resin with a carboxylic acid having a single ethylenic unsaturation. Specific vinyl ester resins commonly used are the reaction product of epoxy functionalized bisphenol A with an acrylic acid, novolac epoxy based or cresolic epoxy based. As a result of the difference in prepolymer synthesis, the vinyl ester resin prepolymers are typically associated with terminal ethylenic unsaturations while polyester resin prepolymers predominantly have ethylenic unsaturations internal to the prepolymer backbone. It is appreciated that the double bond can be either internal or terminal or mix of both.

The polymeric resin prepolymer is suspended or dissolved in an ethylenically unsaturated monomer that copolymerizes with the resin during the thermoset process. It is appreciated that more than one type of monomer can be used in a molding composition. The monomer provides benefits including lower prepolymer viscosity and thermosetting without formation of a volatile byproduct. Monomer is typically present up to 18.5 total weight percent of a molded article.

A typical molding composition includes a free radical initiator to initiate cross-linking between the polymeric prepolymer resin with itself or with ethylenically unsaturated monomer, if present. A free radical initiator is typically chosen to preclude significant cross-linking at lower temperature so as to control the thermoset conditions. Conventional free radical polymerization initiators contain either a peroxide or azo group. Peroxides operative herein illustratively include benzoyl peroxide, cyclohexanone peroxide, ditertiary butyl peroxide, dicumyl peroxide, tertiary butyl perbenzoate and 1,1-bis(t-butyl peroxy) 3,3,5-trimethylcyclohexane. Azo species operative herein illustratively include azobisisobutyronitrile and t-butylazoisobutyronitrile. While the quantity of free radical polymerization initiator present varies with factors such as desired thermoset temperature and decomposition thermodynamics, an initiator is typically present from 0.1 to 3 total weight percent. In order to lessen cross-linking at temperatures below the desired thermoset temperature, a polymerization inhibitor is often included in base molding formulations. Hydroquinone and t-butyl catechol are conventional inhibitors. An inhibitor is typically present between 0 and 1 total weight percent.

The inventive molding composition in certain inventive embodiments includes a particulate filler. Particulate fillers operative in such molding compositions illustratively include calcium carbonate, calcium silicate, alumina, ATH, silica, talcs, dolomite, vermiculite, diatomaceous earth, kaolin clay, graphite, metal and combinations thereof. Factors relevant in the choice of a particulate filler illustratively include filler cost, resultant viscosity of flow properties, resultant shrinkage, surface finish weight, flammability, electrical conductivity, and chemical resistance of the thermoset formulation. Particulate filler typically accounts from 0 to 80 weight percent of the molding composition total weight. Typical filler sizes are from 0.1 to 50 microns.

Other fiber fillers typically are added and illustratively include carbon, polyimides, polyesters, polyamides, and natural fibers such as cotton, silk, and hemp. Fiber fillers are typically present from 0 to 80 total weight percent. It is appreciated that mixtures of various types of fibers are readily made to achieve desired strengths and article densities.

A mold release agent is typically provided to promote mold release. Mold releases include fatty acid salts illustratively including oleates, palmitates, stearates of metal ions such as sodium, zinc, calcium, magnesium, and lithium. A mold release is typically present from 0 to 5 total weight percent.

A low profile additive is optionally provided to improve surface properties and dimensional stability of a resulting molded product. Low profile additives illustratively include thermoplastics and elastomers such as polyethylene, polystyrene, polyvinyl toluene, polyacrylates, polyethylene ether polymers, polyphenylene oxide polymers, polyvinyl acetate, PMMA, polystyrene, polybutadiene, saturated polyesters, and combinations thereof. Copolymers operative as low profile additives include the above-recited polymers in addition to copolymers of the same including butadiene, acrylonitrile, and vinyl chloride. Low profile additives are typically present from 0 to 50 total weight percent and more often from 5 to 40 total weight percent.

A nanocomposite clay is lipophilic and has domains of a size that do not contribute to the molded article surface roughness. An alkyl quaternary ammonium bentonite nanocomposite clay operative herein is commercially available (Southern Clay Products, CLOISITE® 10A). Clay domains are on the order of 50 to 150 nanometers and have a platelet thickness of one to 10 nanometer and are optionally used alone, or in combination with a polymeric moisture reducing additive to enhance the processability of an inventive formulation while decreasing the moisture absorption rate. Such nanocomposite clay is typically present up to 10 total weight percent.

It is appreciated that the present invention optionally also incorporates additional additives illustratively including flameretardants, plasticizers, colorants, and other processing additives conventional to the art.

Many variations, substitutions, and modifications may be made to the above-described embodiment(s) without departing substantially from the spirit and principles herein. All such variations, substitutions, and modifications are intended to be included herein within the scope of this disclosure and the following claims.

The invention claimed is:

1. A molded article comprising:
a resin matrix having a surface, said resin matrix formed from cross-linked polyester resin or vinyl-ester resin;
glass fibers in said resin matrix, said resin matrix surrounding said glass fibers;
a first plurality of glass microspheroids within said resin matrix;
a first molecule of a silane coupling agent having two moieties reacted with glass surface hydroxyl groups of the glass fibers and glass microspheroids to covalently bond a first of said glass fibers to the first moiety and a first of said plurality of microspheroids to the second moiety, said silane coupling agent present in a concentration of 0.005 to 0.1 grams of said silane coupling agent per gram of said glass fibers; and
a second molecule of said silane coupling agent having two moieties reacted with glass surface hydroxyl groups of the glass fibers and glass microspheroids to covalent bond a first of said glass fibers to the first moiety and a second of said plurality of microspheroids to the second moiety.

2. The article of claim 1 wherein a first of said two moieties of said silane coupling agent is a silane moiety and a second of said two moieties of said silane coupling agent is an amine moiety.

3. The article of claim 2 further comprising a third molecule of silane coupling agent covalently bonded to one of said glass fibers or one of said plurality of microspheroids, said third molecule of silane coupling agent having a moiety of: cyano, urethane, or urea moiety reacted with said resin during cure of said resin to form said resin matrix.

* * * * *